(No Model.) 3 Sheets—Sheet 2.
A. F. BERGQVIST.
AERIAL VESSEL.
No. 506,969. Patented Oct. 17, 1893.
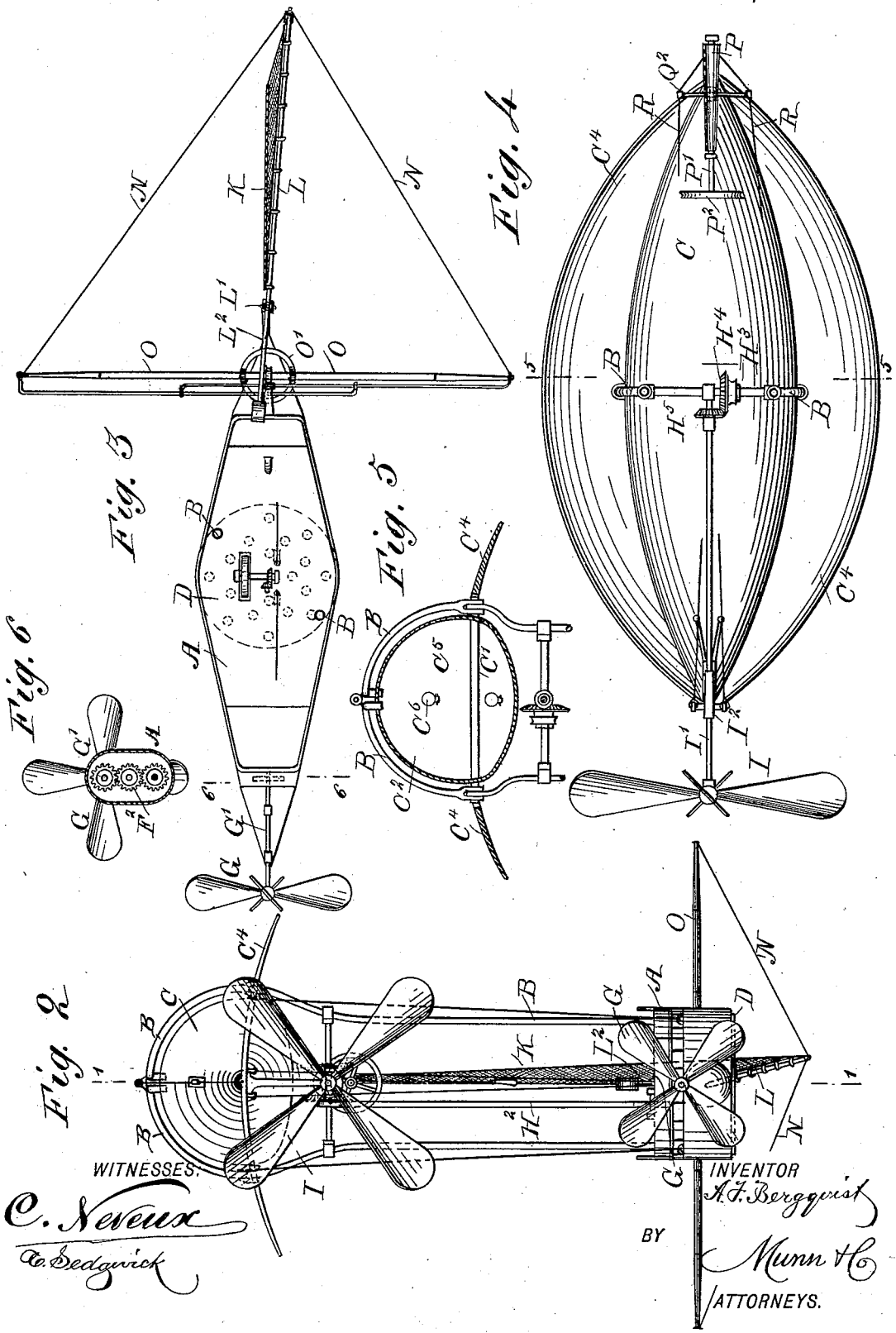
WITNESSES:
C. Neveux
Co. Sedgwick
INVENTOR
A. F. Bergqvist
BY
Munn & Co
ATTORNEYS.

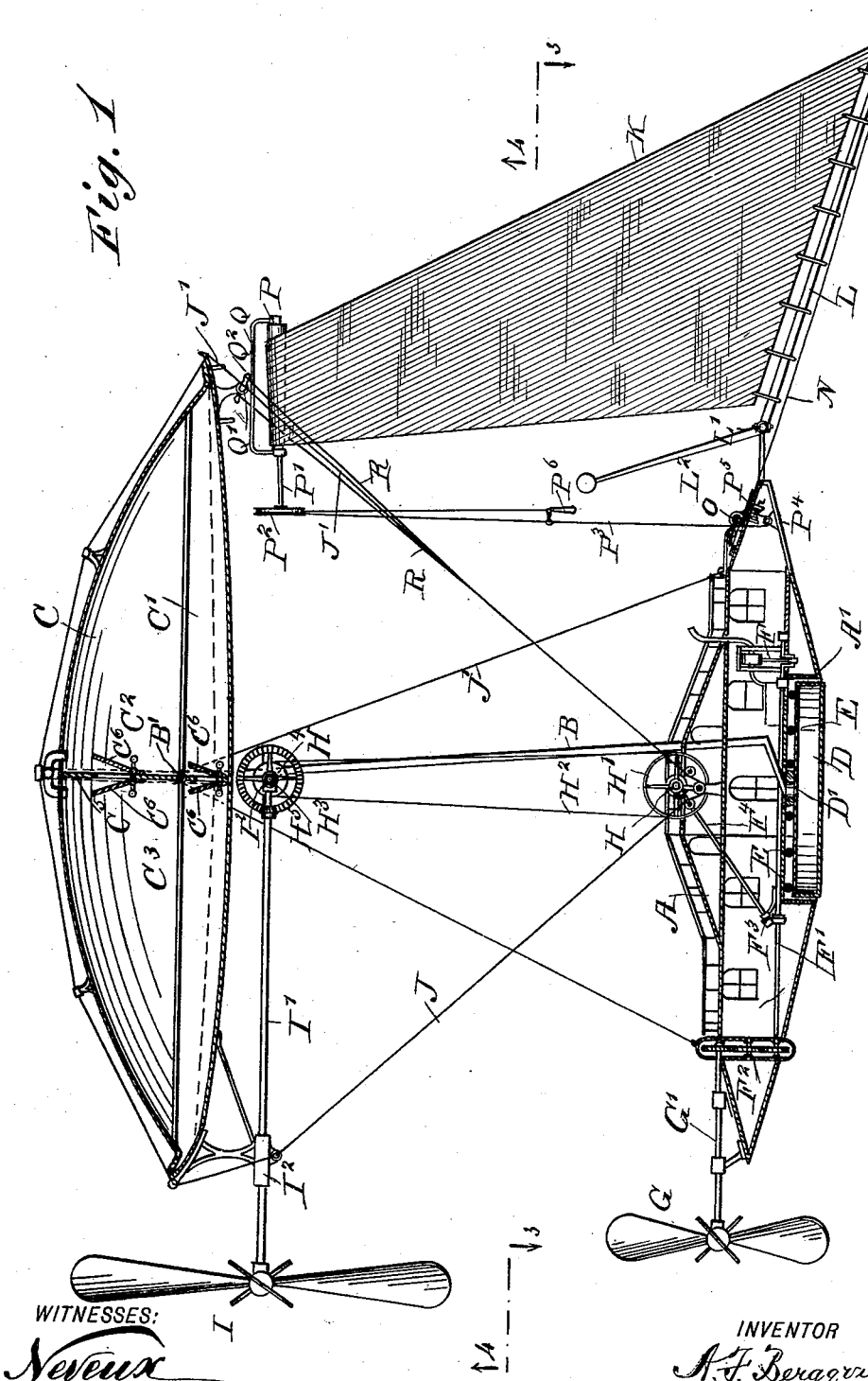

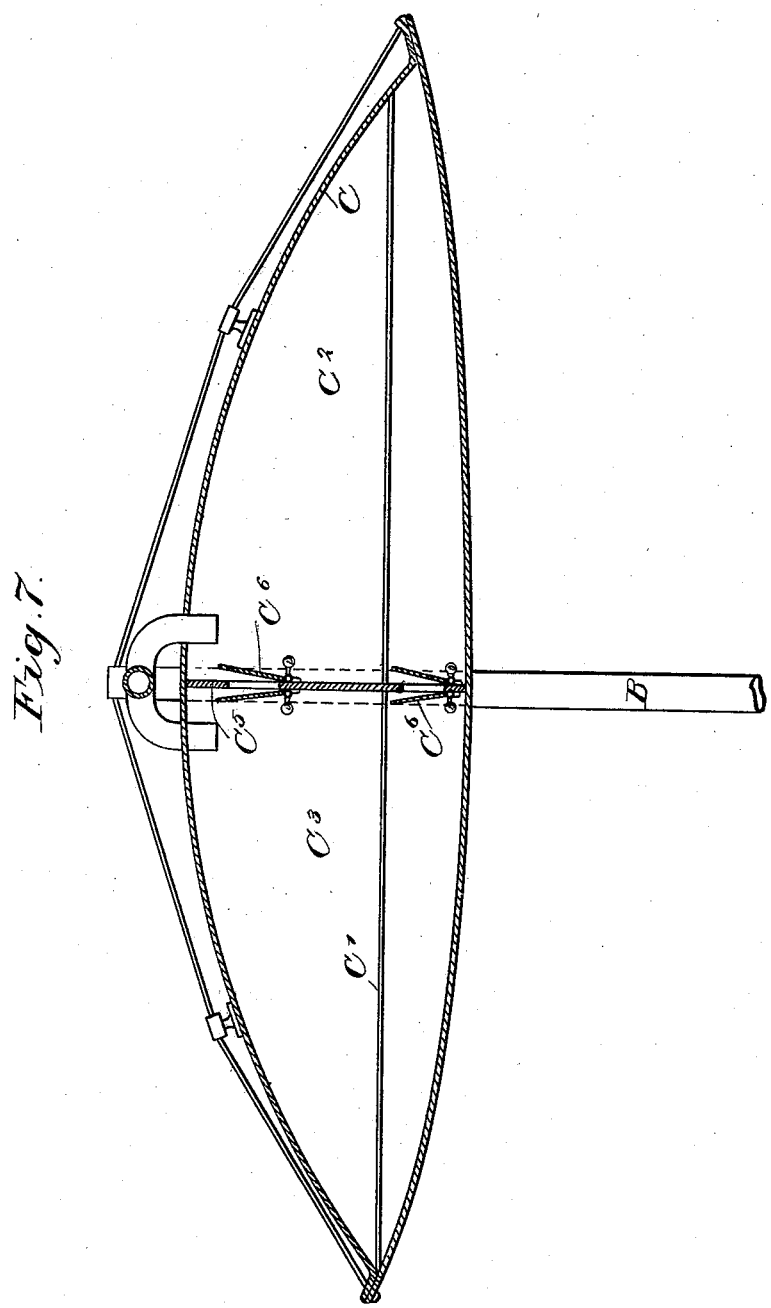

UNITED STATES PATENT OFFICE.

AXEL F. BERGQVIST, OF FAIRFIELD, IOWA.

AERIAL VESSEL.

SPECIFICATION forming part of Letters Patent No. 506,969, dated October 17, 1893.

Application filed January 11, 1893. Serial No. 458,055. (No model.)

*To all whom it may concern:*

Be it known that I, AXEL F. BERGQVIST, of Fairfield, in the county of Jefferson and State of Iowa, have invented a new and Improved Aerial Vessel, of which the following is a full, clear, and exact description.

The object of the invention is to provide a new and improved aerial vessel, which is simple and durable in construction and arranged to be readily propelled through the air and steered in any desired direction.

The invention consists principally of a balloon, pipes communicating with the interior of the balloon and extending downwardly therefrom a cage or basket secured to the said pipes and containing a gas reservoir, connected with the pipes and propeller wheels held on both the basket and balloon and driven from machinery located in the basket.

The invention also consists of certain parts and details and combinations of the same, as will be hereinafter described and then pointed out in the claims.

Reference is to be had to the accompanying drawings forming a part of this specification, in which similar letters of reference indicate corresponding parts in all the figures.

Figure 1 is a sectional side elevation of the improvement on the line 1—1 of Fig. 2. Fig. 2 is a front end view of the same. Fig. 3 is a sectional plan view of the same on the line 3—3 of Fig. 1. Fig. 4 is an inverted sectional plan view of the same on the line 4—4 of Fig. 1. Fig. 5 is a transverse section of the balloon on the line 5—5 of Fig. 4; and Fig. 6 is a sectional side elevation of part of the propeller mechanism and basket on the line 6—6 of Fig. 3. Fig. 7 is a longitudinal vertical section of the balloon proper.

The improved aerial vessel is provided with a closed cage or basket A made of suitable material and of the desired dimensions for containing passengers, operators and freight, the cage being properly ventilated and lighted by suitable means. The balloon C is made of sheet metal or other suitable material and in it discharge the pipes B which, besides forming the means for suspending the basket also serve to deliver the necessary gas to the balloon from a reservoir D, located in the recess A' formed on the under side of the cage or basket A. This reservoir D forms the bottom for the cage or basket A, and in order to relieve the latter of any concussion in descending to the ground, rubber balls E are interposed between the top of the reservoir D, and the under side of the recess A' of the cage or basket A. The reservoir D is used to inflate the balloon and to carry an additional supply of gas after the balloon is inflated. As shown in Fig. 1, the reservoir D is mounted to turn and is, for this purpose, pivoted at its center at D' to the bottom of the basket or cage A. Owing to this arrangement, the balloon and basket can be turned to suit the wind without moving the reservoir D, which is adapted to rest on the ground. The balloon itself may be provided with a horizontally-extending ledge or frame serving to strengthen the balloon.

A suitable machine F located in the basket A and driven either by gas stored in the reservoir D, or by other means, actuates the main driving shaft F' extending horizontally and connected by a train of gear wheels $F^2$ with the propeller shaft G' arranged in the forward end of the basket A and carrying a propeller wheel G of any approved construction. The main driving shaft F' is also connected by bevel gear wheels $F^3$ with a shaft $F^4$ extending in an inclined position, as shown in Fig. 1 and geared at its upper end with a shaft H arranged transversely in the top of the basket or cage A. On this shaft H is secured a pulley H' connected by a belt $H^2$ with a pulley $H^3$ on a shaft journaled in suitable bearings arranged on the pipes B at a suitable distance from the under side of the balloon C. This shaft $H^4$ is geared by gear wheels $H^5$ with a second propeller shaft I' carrying at its forward end a propeller wheel I of any approved construction. The shaft I' is mounted in suitable bearings $I^2$ held on the under side of the balloon C and adapted to slide backward and forward on the shaft I' to allow the balloon to work up and down. The said shaft I' extends forward, as shown, so that the propeller wheel I is located at the front end of the balloon C, above the propeller wheel G located in front of the basket A. When the main driving shaft F' is rotated, a rotary motion is given to either or both propeller wheels G and I, so that the vessel is driven forward or backward according to the direction in which the main driving shaft is revolved.

In order to cause the aerial vessel to ascend or descend, the balloon C is tilted on its centers B' and in order to accomplish this result, the ends of the balloon are connected by ropes J and J', with a suitable windlass located on the basket A. Now, by pulling on the rope J, the balloon C will swing into an inclined position with its forward end downward, so that on a forward motion of the vessel, it will descend. When the other rope J' is pulled, the rear end of the balloon C will swing downward and the front end upward, so that on a forward motion of the aerial vessel, the latter will ascend. It will be seen that when the balloon C is thus moved into an inclined position for either ascending or descending, the basket or cage A will remain in its natural horizontal position.

In order to steer the aerial vessel, I employ a rudder sail K connected at its lower end in the usual manner, with a boom L pivoted at L' on the rear end of the basket A. A counterbalance or weight $L^2$ projects forwardly from the boom L for the purpose of assisting to raise the outer end of the boom. The forward end of the boom is connected by ropes N with a transversely-extending bar O mounted to swing at its center at O' on the top of the basket A at the rear end thereof, so as to cause the boom to swing either to the right or left according to the direction in which it is desired to steer the aerial vessel. The upper end of the rudder sail K is passed over a roller P, the shaft P' of which is journaled in a frame Q hung on the under side of the balloon C at the rear end thereof, as plainly shown in Fig. 1. The frame Q is provided with a transversely-extending arm $Q^2$ connected at its end with ropes R reaching to the basket or cage A to be under the control of the operator located in the basket. Over a pulley $P^2$ secured on the shaft P' of the roller P, passes a rope $P^3$, one end of which after leaving the pulley $P^2$, extends downward and passes under a small pulley $P^4$ held on the rear end of the basket A and then this end of the rope is connected with a windlass $P^5$ on the basket. A weight $P^6$ is attached to the downwardly-hanging end of the rope $P^3$, as plainly shown in Fig. 1. The purpose of the rope $P^3$ and pulley $P^2$ is to keep the rudder sail K in proper tension by the rotation of the roller P which ensues when the rear end of the balloon is raised or lowered.

As shown in Figs. 2, 4 and 5, the balloon C is provided with sidewise extending wings $C^4$ to give more bearing power to the balloon so as to readily float in the air. As shown in Figs. 1 and 5, a transverse partition $C^5$ is arranged at or near the middle of the balloon and provided with suitable valves $C^6$ operated automatically by their own weight to prevent the gas from flowing into a raised end of the balloon when the latter is tilted, as previously described. Two compartments $C^2$ and $C^3$ are formed by the said partition $C^5$, and each of the compartments communicates with one of the pipes B.

It will be seen that an aerial vessel constructed in this manner can be readily propelled in the air or steered in any desired direction. It will further be seen that the ascending and descending of the balloon are fully under the control of the operator.

Having thus fully described my invention, I claim as new and desire to secure by Letters Patent—

1. An aerial vessel, comprising a balloon, a basket suspended beneath the balloon, propeller wheels held at the front ends of both the basket and the balloon, machinery for driving the propeller wheels, and means for tilting the balloon from the basket, substantially as shown and described.

2. In an aerial vessel, a rudder sail extending between the rear ends of the balloon and the basket, and secured with its upper end to a winding roller suspended from the balloon, and with its lower end to a boom projecting from the basket, substantially as shown and described.

3. In an aerial vessel, comprising a balloon capable of being tilted, and a basket suspended beneath the same, a rudder sail secured with its upper end to a roller located in proximity of the balloon, and with its lower end to a boom projecting from the basket, and means for automatically rotating the roller when the balloon is tilted, whereby the rudder sail is kept in proper tension, substantially as shown and described.

4. An aerial vessel, comprising a partitioned balloon, pipes depending from the balloon and each communicating with one of the compartments of the balloon, a basket suspended beneath the balloon and secured to the said pipes, and a gas reservoir located on the basket and connected to the pipes, substantially as shown and described.

5. An aerial vessel, comprising a balloon having a transverse partition provided with automatic valves, pipes depending from the balloon and each communicating with one of the compartments of the same, a basket suspended beneath the balloon, and a gas reservoir located on the basket and connected to the pipes, substantially as shown and described.

6. An aerial vessel comprising a balloon, a basket suspended beneath the same, a gas reservoir pivoted to the basket, and pipes connecting the said reservoir to the said balloon, substantially as shown and described.

AXEL F. BERGQVIST.

Witnesses:
SIMPSON J. CHESTER,
JAMES M. HINKLE.